(12) United States Patent
Carney et al.

(10) Patent No.: US 9,684,115 B1
(45) Date of Patent: Jun. 20, 2017

(54) LIGHT FIXTURES WITH WAVEGUIDES

(71) Applicants: Anthony James Carney, Fayetteville, GA (US); Paul Wayne Lewis, Sharpsburg, GA (US); Jose Antonio Laso, Newnan, GA (US)

(72) Inventors: Anthony James Carney, Fayetteville, GA (US); Paul Wayne Lewis, Sharpsburg, GA (US); Jose Antonio Laso, Newnan, GA (US)

(73) Assignee: Cooper Technologies Company, Houston, TX (US)

( * ) Notice: Subject to any disclaimer, the term of this patent is extended or adjusted under 35 U.S.C. 154(b) by 76 days.

(21) Appl. No.: 14/683,801

(22) Filed: Apr. 10, 2015

Related U.S. Application Data

(60) Provisional application No. 61/978,691, filed on Apr. 11, 2014.

(51) Int. Cl.
*F21V 8/00* (2006.01)

(52) U.S. Cl.
CPC ......... *G02B 6/0045* (2013.01); *G02B 6/0055* (2013.01); *G02B 6/0063* (2013.01); *G02B 6/0085* (2013.01)

(58) Field of Classification Search
CPC .. G02B 6/0045; G02B 6/0055; G02B 6/0063; G02B 6/0085
USPC .............................................. 362/628, 217.04
See application file for complete search history.

(56) References Cited

U.S. PATENT DOCUMENTS

| | | | | |
|---|---|---|---|---|
| 7,334,932 B2 * | 2/2008 | Klettke | .................. | B60Q 3/004 362/231 |
| 8,130,340 B2 * | 3/2012 | Ohmi | ...................... | G02B 6/002 349/65 |
| 8,454,214 B2 * | 6/2013 | Kazaoka | ............. | B60Q 1/2665 362/249.02 |
| 8,454,218 B2 * | 6/2013 | Wang | ................... | G02B 6/0018 362/607 |
| 8,477,259 B2 * | 7/2013 | Kubota | ............. | G02F 1/133615 349/58 |
| 8,958,029 B2 * | 2/2015 | Matsuo | ................ | G02B 6/0046 349/65 |
| 2004/0114342 A1 * | 6/2004 | Lin | ....................... | G02B 6/0046 362/628 |
| 2004/0114343 A1 * | 6/2004 | Ho | ........................ | G02B 6/0013 362/628 |
| 2010/0208494 A1 * | 8/2010 | Kuo | ........................ | G02B 6/002 362/612 |
| 2011/0242831 A1 * | 10/2011 | Okui | ...................... | F21S 48/115 362/511 |
| 2013/0094246 A1 * | 4/2013 | Kim | .......................... | G09F 9/35 362/613 |
| 2015/0049509 A1 * | 2/2015 | Meyers | ................ | G02B 6/0011 362/612 |
| 2016/0103269 A1 * | 4/2016 | Narita | .................. | G02B 6/0045 362/617 |

* cited by examiner

*Primary Examiner* — Laura Tso
(74) *Attorney, Agent, or Firm* — King & Spalding LLP

(57) ABSTRACT

A curved waveguide is described herein. The curved waveguide can include a length having at least one portion. The curved waveguide can also include a width, a height, and at least one side. A first portion of the at least one portion of the length can have a first curvature. The at least one side is configured to receive light emitted by at least one light module disposed adjacent to the at least one side.

18 Claims, 11 Drawing Sheets

LIGHT FIXTURES WITH WAVEGUIDES

CROSS-REFERENCE TO RELATED APPLICATIONS

This application claims priority under 35 U.S.C. §119 to U.S. Provisional Patent Application Ser. No. 61/978,691, titled "Curved Waveguides" and filed on Apr. 11, 2014, the entire contents of which are hereby incorporated herein by reference.

TECHNICAL FIELD

Embodiments described herein relate generally to light fixtures, and more particularly to systems, methods, and devices for light-emitting diode (LED) fixtures with waveguides.

BACKGROUND

Many light fixtures today generate a high amount of glare. In addition to being aesthetically unpleasing, this glare can cause annoyance to a user. For example, the uneven distribution of light caused by the glare can be distracting, cause visual misperceptions, and cause a tripping or other safety hazard. The glare from a light source can be caused by a lens, a diffuser, a reflector, and/or some other optical device of the light source.

SUMMARY

In general, in one aspect, the disclosure relates to a curved waveguide having a length, a width, a height, and at least one side. The length can have at least one portion. A first portion of the at least one portion of the length can include a first curvature. The at least one side can be configured to receive light emitted by at least one light module disposed adjacent to the at least one side.

In another aspect, the disclosure can generally relate to a light fixture. The light fixture can include a heat sink having at least one coupling feature, and at least one first light module thermally coupled to the heat sink. The light fixture can also include a curved waveguide having a length, a width, a height, and a first side. The length can include at least one waveguide portion. The at least one first light module can be disposed adjacent to the first side of the curved waveguide and can direct light into the curved waveguide. A first portion of the at least one waveguide portion of the length can have a first curvature.

These and other aspects, objects, features, and embodiments will be apparent from the following description and the appended claims.

BRIEF DESCRIPTION OF THE DRAWINGS

The drawings illustrate only example embodiments of curved waveguides (sometimes called "wave guides") and are therefore not to be considered limiting of its scope, as curved waveguides may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1A:
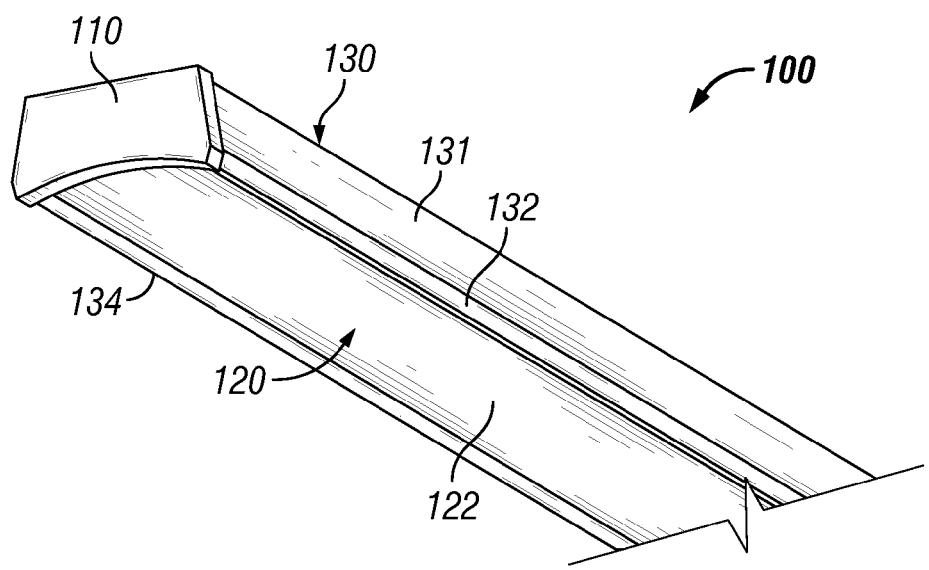
FIGS. 1A-1C show various views of a light fixture with a curved waveguide in accordance with certain example embodiments.

The example embodiments discussed herein are directed to systems, apparatuses, and methods of light fixtures, modules, and other systems using curved waveguides. While the figures shown and described herein are directed to light fixtures using LED technologies, example curved waveguides can also be used to envelop other types of lighting technologies, including but not limited to fluorescent, halogen, and incandescent. Thus, the examples of curved waveguides described herein are not limited to LED technology.

Further, when the light modules that are used with example curved waveguides described herein use LED technology, the light modules can be LED light strips (e.g., flexible, rigid), chip-on-board, discrete die, and/or any other suitable type of LED. The light sources of the light modules can be continuous, equidistant, or randomly disposed along a side of a curved waveguide. The light fixture can be any type of light fixture, including but not limited to a pendant, a troffer, a drop fixture, and a high bay. The term "curved waveguides" can refer to waveguides with one or more non-zero (e.g., non-planar, non-linear) curvatures. Similarly, reflectors referred to herein can have one or more non-zero curvatures. A curvature of a reflector can be substantially the same as (and coincide with) a curvature of a curved waveguide. In addition, or in the alternative, a curvature of a reflector and a curvature of a curved waveguide can be independent of each other. In certain example embodiments, the curvature of some or all of a curved waveguide and/or a reflector can be zero (e.g., planar, linear).

As defined herein, a "curve" of example curved waveguides (and, if applicable, curved reflectors) is any intentional non-linear or non-planar contour to the waveguide or reflector. The curvature can be substantially constant (defined, for example, by a focal point) and/or vary over the length and/or width of an example curved waveguide or reflector. The curvature can be concave and/or convex. In some cases, one or more portions of a curved waveguide are linear (planar) instead of curved. The shape, size, and position of the contours of an example curved waveguide or reflector can be specifically engineered and designed for a particular light fixture having one or more particular light modules positioned in particular locations. The contours of an example curved waveguide and/or reflector can have one or more of a number of benefits, including but not limited to reduced or eliminated glare, aesthetics, and flexible design.

The various components of light fixtures using curved waveguides can be made of one or more of a number of suitable materials, including but not limited to plastic, glass, rubber, a polymer, and metal. A light fixture as defined herein can be a stand-alone fixture. Alternatively, a light fixture can actually be one of a number of light modules that are part of one or more of a number of fixtures. A light fixture (or components thereof) using example curved waveguides can be a new light fixture for a new installation, a new light fixture to replace an existing light fixture, or a retrofit of an existing light fixture.

Any component described in one or more figures herein can apply to any subsequent (or other) figures having the same label. In other words, the description for any component of a subsequent (or other) figure can be considered substantially the same as the corresponding component described with respect to a previous (or other) figure. Further, if a component associated with a figure is described but not expressly shown or labeled in the figure, a corresponding component shown and/or labeled in another figure can be inferred. The numbering scheme for the components in the figures herein parallel the numbering scheme for the components of previously or subsequently described figures in that each component is a three digit number having the identical last two digits.

As described herein, a user can be any person that interacts with a light fixture having an example curved waveguide. Examples of a user may include, but are not limited to, a consumer, an electrician, an engineer, a mechanic, a consultant, a contractor, a homeowner, and a manufacturer's representative. In one or more embodiments, one or more of the components shown in the following figures may be omitted, added, repeated, and/or substituted. Accordingly, embodiments of light fixtures with curved waveguides should not be considered limited to the specific arrangements of components shown in such figures.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number and corresponding components in other figures have the identical last two digits.

Example embodiments of curved waveguides will be described more fully hereinafter with reference to the accompanying drawings, in which example embodiments of curved waveguides are shown. Curved waveguides may, however, be embodied in many different forms and should not be construed as limited to the example embodiments set forth herein. Rather, these example embodiments are provided so that this disclosure will be thorough and complete, and will fully convey the scope of curved waveguides to those of ordinary skill in the art. Like, but not necessarily the same, elements (also sometimes called components) in the various figures are denoted by like reference numerals for consistency.

Terms such as "first", "second", "length", "width", "height", "distal", "proximal", "top", "bottom", "side", "left", and "right" are used merely to distinguish one component (or part of a component or state of a component) from another. Such terms are not meant to denote a preference or a particular orientation, and are not meant to limit embodiments of curved waveguides. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
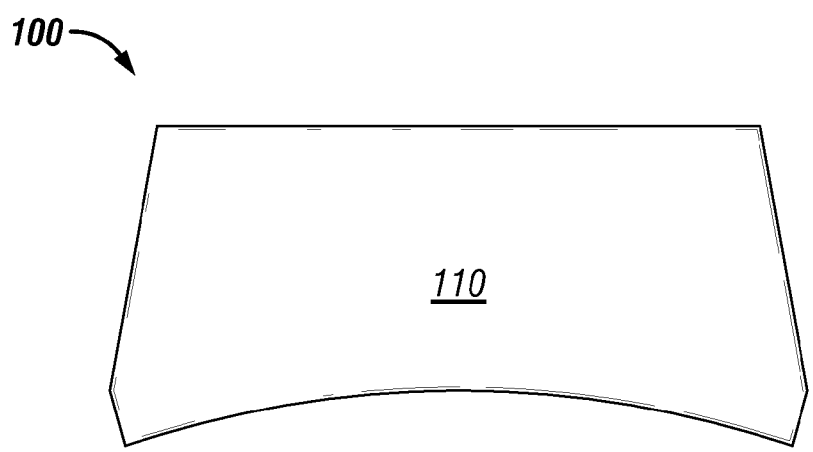
Figure 1C:
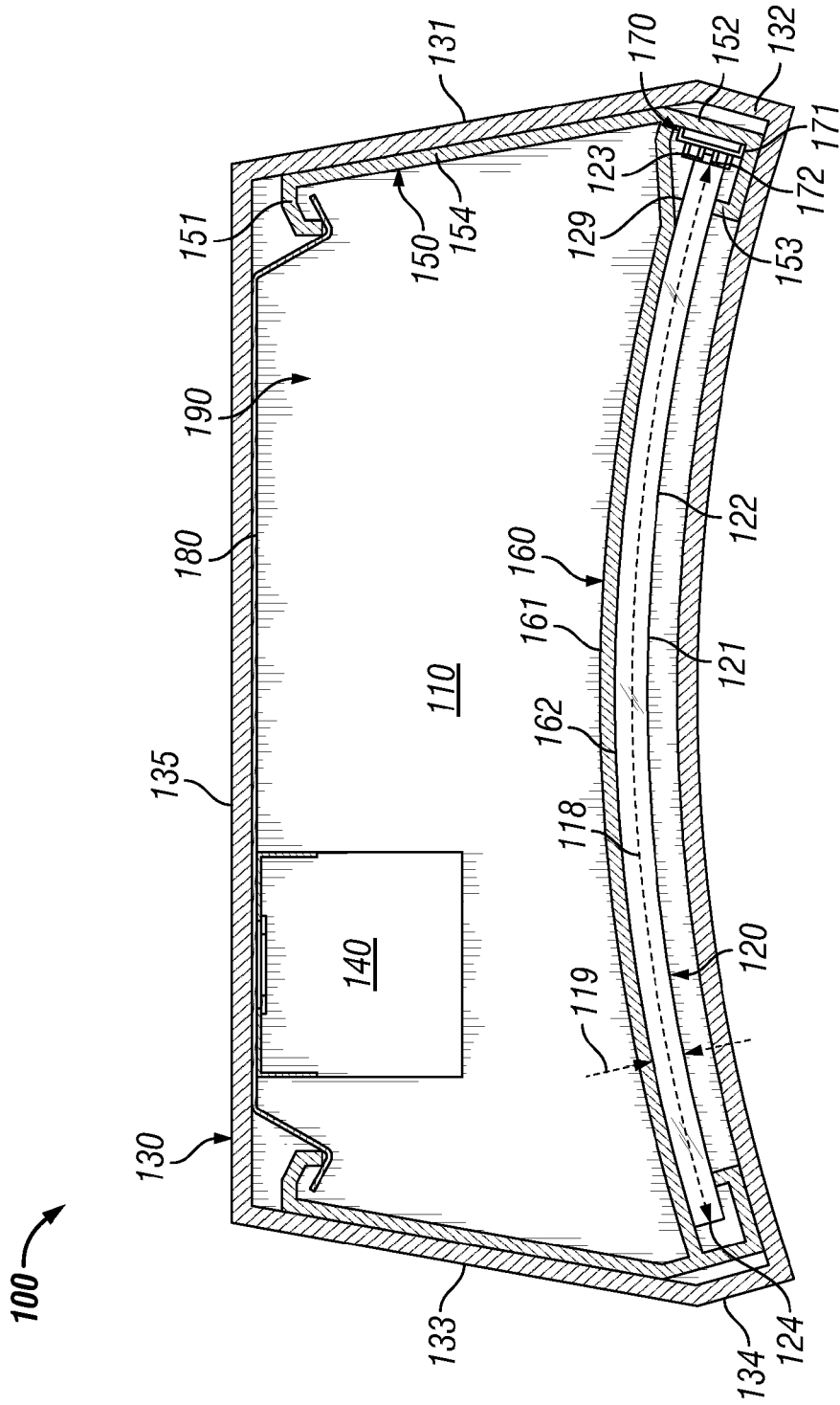

FIGS. 1A-1C show various views of a light fixture 100 with a curved waveguide 120 in accordance with certain example embodiments Specifically, FIG. 1A shows a bottom-side perspective view of the light fixture 100. FIG. 1B shows a side view of the light fixture 100. FIG. 1C shows a cross-sectional side view of the light fixture 100. Referring to FIGS. 1A-1C, the light fixture 100 can include a housing 130, a power source 140, a mounting bracket 180, a heat sink 150, at least one reflector (e.g., reflector 160), at least one light module 170, and at least one curved waveguide 120.

The housing 130 can have one or more of a number of portions that form a cavity 190. For example, the housing 130 can include a top side 135, a left side 134, a right side 132, a left-top side 133, and a right-top side 131. The housing 130 can also include an end cap 110 disposed on one or both ends of the housing 130. One or more components of the light fixture 100 can be disposed within the cavity 190 of the housing 130. One or more portions of the housing 130 can be made from a single piece, as from a mold. Alternatively, one or more portions of the housing 130 can be made from multiple pieces that are mechanically coupled to each other using one or more of a number of coupling means, including but not limited to epoxy, welding, fastening devices, compression fittings, and slotted fittings.

The power source 140 can any device or series of devices that provide power and/or control to the light modules 170. Examples of a power source 140 can include, but are not limited to, a driver, a ballast, and a battery. The power source 140 can generate power and/or receive power from an external source. In the latter case, the power source 140 can receive power in one form (e.g., alternating current) and generate (e.g., invert, convert, transform) power in another form (e.g., direct current). The mounting bracket 180 can be used to retain one or more other components of the light fixture 100 within the cavity 190. For example, in this case, the mounting bracket 180 is used to hold the power source 140 and the heat sinks 150 in place.

The one or more heat sinks 150 can be made of a thermally conductive material, allowing the heat sink 150 to absorb heat generated by one or more heat-generating components (e.g., the power source 140, a light module 170). In other words, the heat sink 150 helps to prevent a heat-generating component of the light fixture 100 from overheating, leading to failure or a shortened life. A heat sink 150 can have one or more features that are used to position, retain, or otherwise control the placement of one or more components of the light fixture 100 within the cavity 190. For example, in this case, the heat sink 150 includes a feature 151 at its top end to couple to a portion of the mounting bracket 180. In such a case, the mounting bracket 180 can be used to hold the heat sink 150 in a certain position within the cavity 190 using the feature 151. As another example, the heat sink 150 can include a feature 152 the retains and positions the light module 170. As yet another example, the heat sink 150 can include a feature 153 to retain and position the curved waveguide 120 relative to the light module 170. The main body 154 of the heat sink 150 in this case is disposed between feature 151 at one end of the heat sink 150 and feature 152 and feature 153 at the other end of the heat sink 150.

A light module 170 can have one or more of a number of configurations. For example, in this case, the light module 170 includes one or more light sources 172 mounted on a light board 171. One or more light modules 170 can be disposed adjacent to one or more edges (also called sides) of the curved waveguide 120. For example, in this case, the light module 170 is disposed adjacent to the right side of the curved waveguide 120. As another example, light modules 170 can be disposed adjacent to the left and the right side of the curved waveguide 120. As yet another example, light modules 170 can be disposed adjacent to the left side, the distal side, the proximate side, and the right side of the curved waveguide 120.

The optional reflector 160 can be made of and/or coated with a reflective material for reflecting light generated by the light source 172 of the light module 170. In certain example embodiments, as shown in FIG. 1C, there is a gap 162 (a physical separation) between the reflector 160 and the curved waveguide 120. The gap 162 can be an air gap that helps provide optical consistency to the light emitted by the light fixture 100. In certain example embodiments, the reflector 160 can have a curvature 161 along its length and/or width that is substantially similar (accounting for the gap 162, if any) to the curvature 121 along the length and/or width of the curved waveguide 120.

In certain example embodiments, the curved waveguide 120 guides, directs, and otherwise manipulates electromagnetic waves (e.g., light) generated by the light source 172 in the optical spectrum. Specifically, light generated by one or more light modules 170 is directed into one or more sides (in this case, the right side 123) of the curved waveguide 120. Once inside the curved waveguide 120, the light is reflected, refracted, diffused, and/or otherwise manipulated to exit the bottom surface 122 and/or the top surface 129 of the curved waveguide 120 in a desired pattern, intensity, and/or other dispersement characteristics.

The curved waveguide 120 can be one or more of a number of types of waveguides, including but not limited to a strip waveguide, a rib waveguide, a dielectric slab waveguide, a photonic crystal waveguide, and a segmented waveguide. The curved waveguide 120 can have any of a number (e.g., three, four, six, eight) of sides and form any of a number of shapes (e.g., triangular, pentagonal, octagonal, irregular) when viewed from above. In this example, the curved waveguide 120 has four sides (left side 124, right side 123, front side, and rear side) and has a rectangular shape when viewed from above.

The curved waveguide 120 has a width 118 (for example, the distance along the curved waveguide 120 between the left side 124 and the right side 123), a thickness 119 (for example, the distance between the top surface 129 and the bottom surface 122 of the curved waveguide 120), and a length (for example, the distance along the curved waveguide 120 between the front side and the rear side). The length of the curved waveguide 120 can be substantially the same or different along its width 118. Similarly, the width 118 of the curved waveguide 120 can be substantially the same or different along its length. Further, the thickness 119 at one point along the curved waveguide 120 can be substantially the same as, or different than, the thickness 119 at another point along the curved waveguide 120.

The curved waveguide 120 has at least one curvature (e.g., curvature 121) (also called a contour) along at least a portion of its length and/or width 118. The curvature 121 can also be disposed along all or a portion of the thickness 119 (also called the height 119) of the waveguide. In other words, the thickness 119 of the curved waveguide 120 can be substantially constant or variable along the curvature 121. In this example, the thickness 119 of curved waveguide 120 is substantially uniform along its length and width 118, and the curvature 121 of the curved waveguide 120 is substantially uniform along its length and width 118. In this case, the curvature 121 is slightly concave and is substantially uniform along the width 118 of the curved waveguide 120.

Figure 2A:
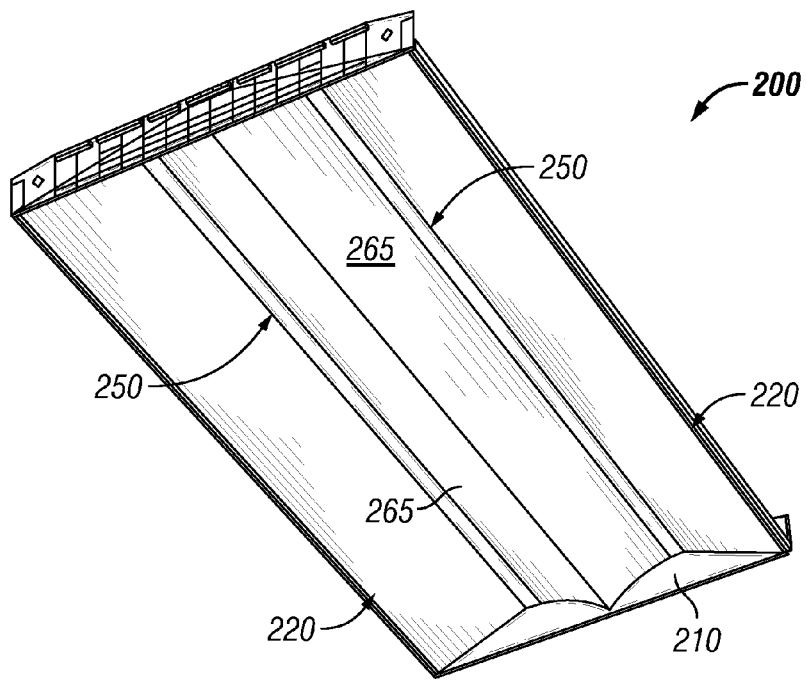
FIGS. 2A-2C show various views of another light fixture with a curved waveguide in accordance with certain example embodiments.
Figure 2B:
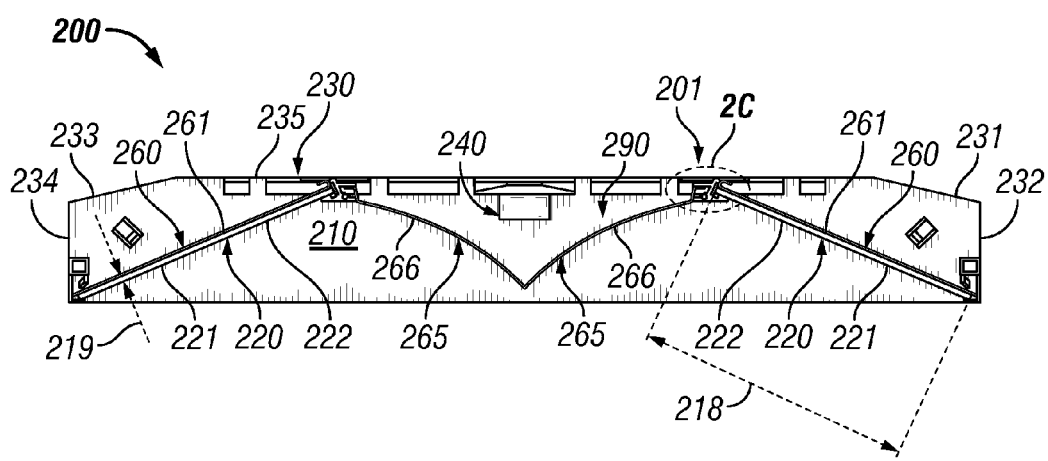
Figure 2C:
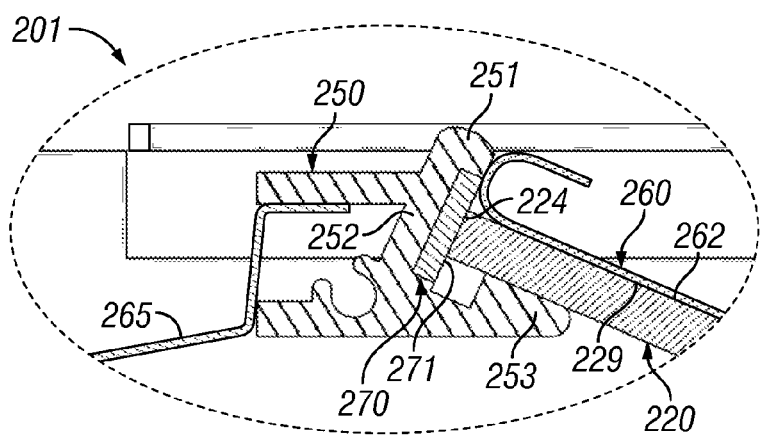

FIGS. 2A-2C show various views of another light fixture 200 with a curved waveguide 220 in accordance with certain example embodiments. Specifically, FIG. 2A shows a bottom-side perspective view of the light fixture 200. FIG. 2B shows a cross-sectional side view of the light fixture 200. FIG. 2C shows a detailed cross-sectional side view of a portion 201 of the light fixture 200. The light fixture 200 of FIGS. 2A-2C is substantially the same as the light fixture 100, except as described below.

Referring to FIGS. 1A-2C, the light fixture 200 is symmetrical (left half and right half) along the length of the light fixture 200. FIG. 2B shows this symmetry. Each half has a curved waveguide 220 that is substantially linear (planar) along its width 218 and length. In other words, the curvature 221 of the curved waveguide 220 is substantially zero along its width 218 and length. In such a case, the curved waveguide 220 can simply be called a waveguide 220. The light modules 270 are disposed just below the top side 235 of the housing 230, slightly more than halfway toward the middle, and are adjacent to one side of the curved waveguide 220. For example, as shown in FIG. 2C, the light module 270 is positioned adjacent to the left side 224 of the waveguide 220. The other side (e.g., the right side 223) of the curved waveguide 220 abuts against (or comes near to abutting against) the distal end of the corresponding side (i.e., right side 232 and left side 234) of the housing 230. A reflector 260 is disposed proximate (adjacent) to the top surface 229 of each curved waveguide 220, leaving a gap 262 between the reflector 260 and the curved waveguide 220 on each half of the light fixture 200. The curvature 261 of each reflector 260 can be substantially the same as the curvature 221 of the adjacent curved waveguide 220.

In addition, there is another reflector 265 positioned between (and coupled to) the heat sink 250 on the left half and the heat sink 250 on the right half. In this case, each end of the reflector 265 is located adjacent to a light module 270. The reflector 265 can have its own curvature 266. To maintain the symmetry of the light fixture 200, the reflector 265 has a left half and a right half. Each half of the reflector 265 in this example has a substantially identical curvature 266. The power source 240 is positioned just below the top side 235 within the cavity 290 behind the reflector 265. The light fixture 200 is an example where the curved waveguide 220 can actually be planar (not curved), but the benefits (e.g., reduced or no glare) of the curved waveguide 220 can be realized by virtue of the curved reflector 265 manipulating the light emitted through the waveguide 220.

Figure 3A:
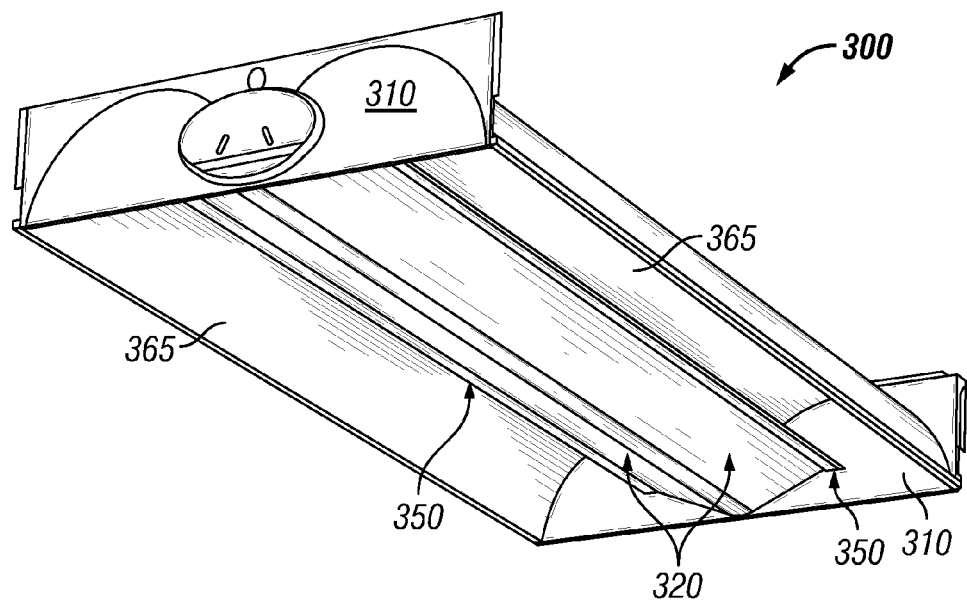
FIGS. 3A-3C show various views of yet another light fixture with a curved waveguide in accordance with certain example embodiments.
Figure 3B:
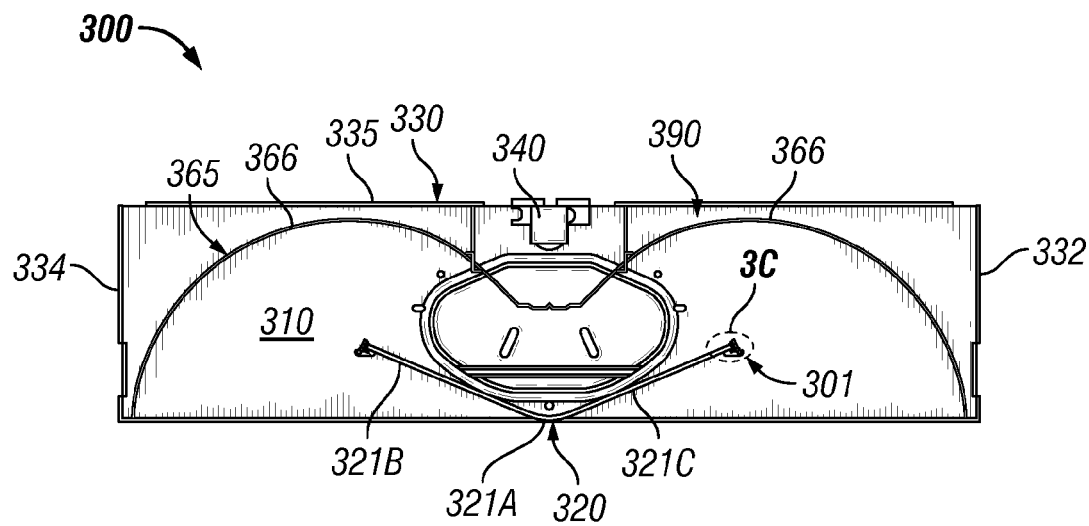
Figure 3C:
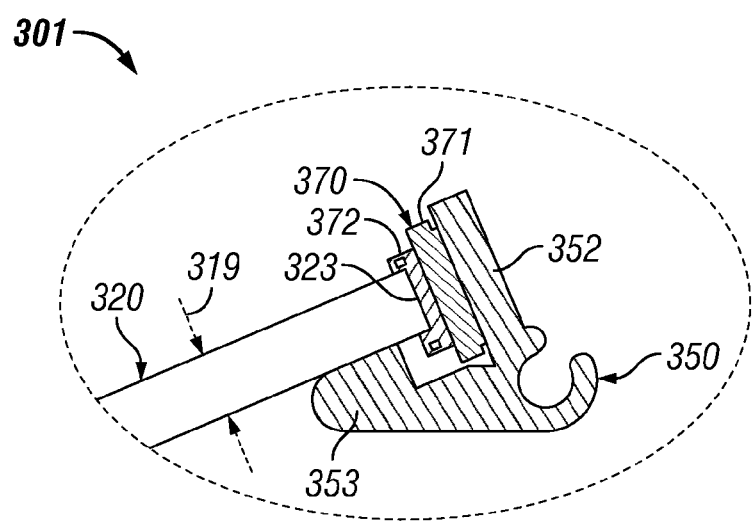

FIGS. 3A-3C show various views of yet another light fixture 300 with a curved waveguide 320 in accordance with certain example embodiments. Specifically, FIG. 3A shows a bottom-side perspective view of the light fixture 300. FIG. 3B shows a cross-sectional side view of the light fixture 300. FIG. 3C shows a detailed cross-sectional side view of a portion 301 of the light fixture 300. The light fixture 300 of FIGS. 3A-3C is substantially the same as the light fixture 100 and the light fixture 200, except as described below.

Referring to FIGS. 1A-3C, the light fixture 300 has a v-shaped curved waveguide 320, where the middle portion of the curved waveguide 320 has a curvature 312A, while the rest of the curved waveguide 320 is substantially linear. A light module 270 is positioned adjacent to each of the left side 324 and the right side 323 of the "V" shape of the curved waveguide 320, and light emitted by the light sources 372 is directed toward the center of the curved waveguide 320, where the curvature 321A is located.

The rest of the curved waveguide 320 adjacent to the center portion (with curvature 321A) can have a different curvature. Specifically, the portion of the curved waveguide 320 to the left of the center can have curvature 321B, and the portion of the curved waveguide 320 to the right of the center can have curvature 321C. Curvature 321B and curvature 321C can be substantially the same as, or different than, each other. In this case, curvature 321B and curvature 321C are both substantially planar (flat). In this example, there is no reflector disposed adjacent to the curved waveguide 320. Instead, a reflector 365 is symmetrically shaped about the center of the light fixture 300 in a length-wise direction, as shown in FIG. 3B. Aside from a linear (straight) middle portion, each half of the reflector 365 has a curvature 366.

The light fixture 300 is an example where the curved waveguide 220 can be partly curved and partly linear (not curved). In this case, the benefits of the curved waveguide 320 can be realized by virtue of the position and curvature 366 of the curved reflector 365 relative to the curved waveguide 320. The curvature 321A in this example is convex. The power source 340 is positioned just below the top side 335 within the cavity 390 behind the reflector 365.

Figure 4A:
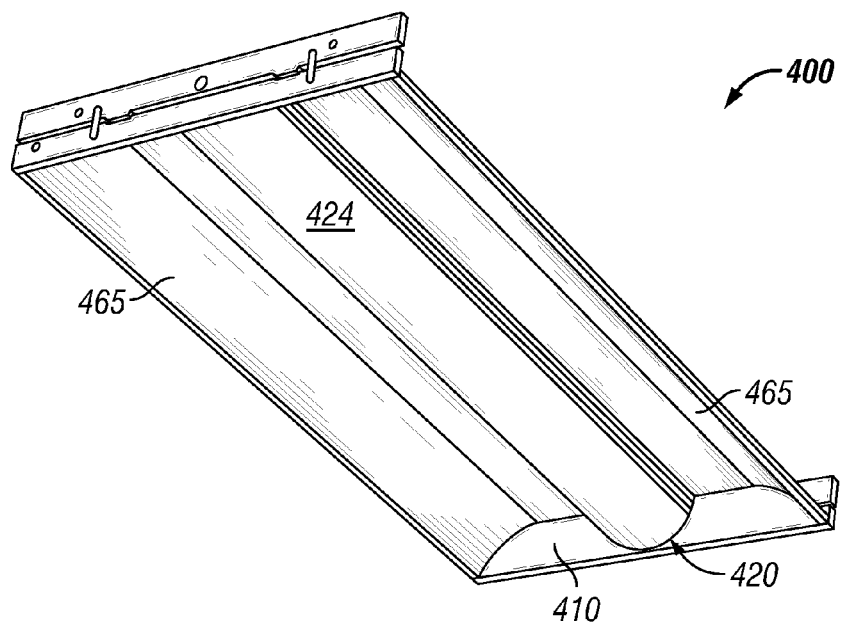
FIGS. 4A-4C show various views of still another light fixture with a curved waveguide in accordance with certain example embodiments.
Figure 4B:
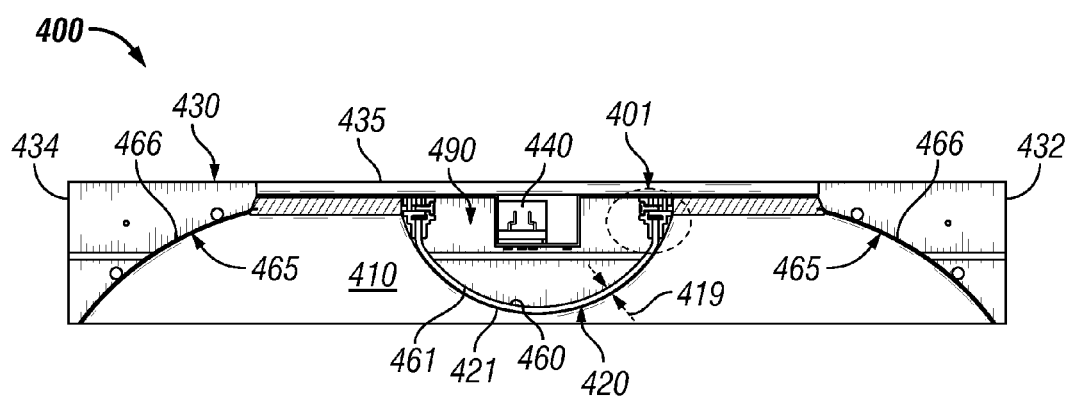
Figure 4C:
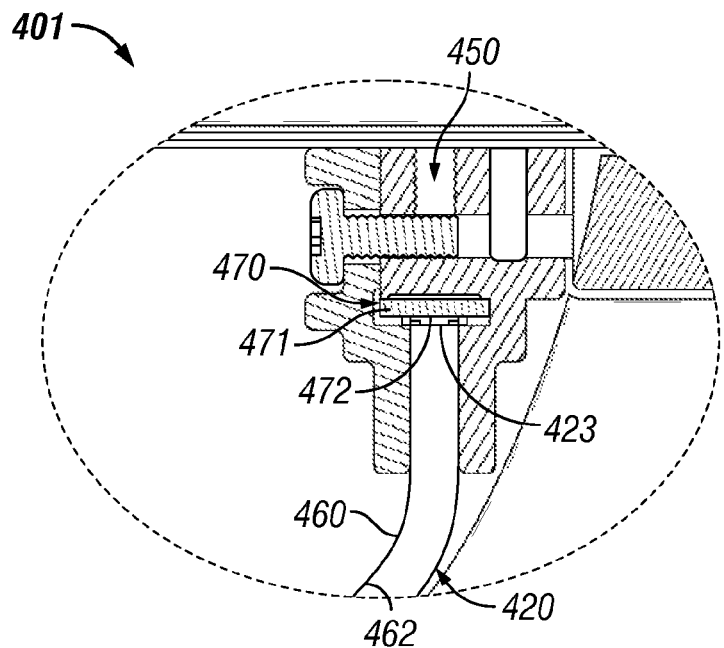

FIGS. 4A-4C show various views of still another light fixture with a curved waveguide 420 in accordance with certain example embodiments. Specifically, FIG. 4A shows a bottom-side perspective view of the light fixture 400. FIG. 4B shows a cross-sectional side view of the light fixture 400. FIG. 4C shows a detailed cross-sectional side view of a portion 401 of the light fixture 400. The light fixture 400 of FIGS. 4A-4C is substantially the same as the light fixture 100, the light fixture 200, and the light fixture 300, except as described below.

Referring to FIGS. 1A-4C, the light fixture 400 is substantially symmetrical along its length. There is a single curved waveguide 420 that has a curvature 421 that is convex. A reflector 460 is positioned proximate to the back side of the curved waveguide 420, leaving a gap 462 between the reflector 460 and the curved waveguide 420. The light modules 470, and the left side 423 and the right side 424 of the curved waveguide 420, are disposed within heat sinks 450 mounted to an inner surface of the top side 435 of the housing 430. An additional reflector 465 having a curvature 466 is disposed at each end of the light fixture 400 and is located at some distance from the curved waveguide 420. The curvature 466 of each reflector 465 in this case is concave. The power source 440 is positioned just below the top side 435 within the cavity 490 behind the reflector 460.

Figure 5A:
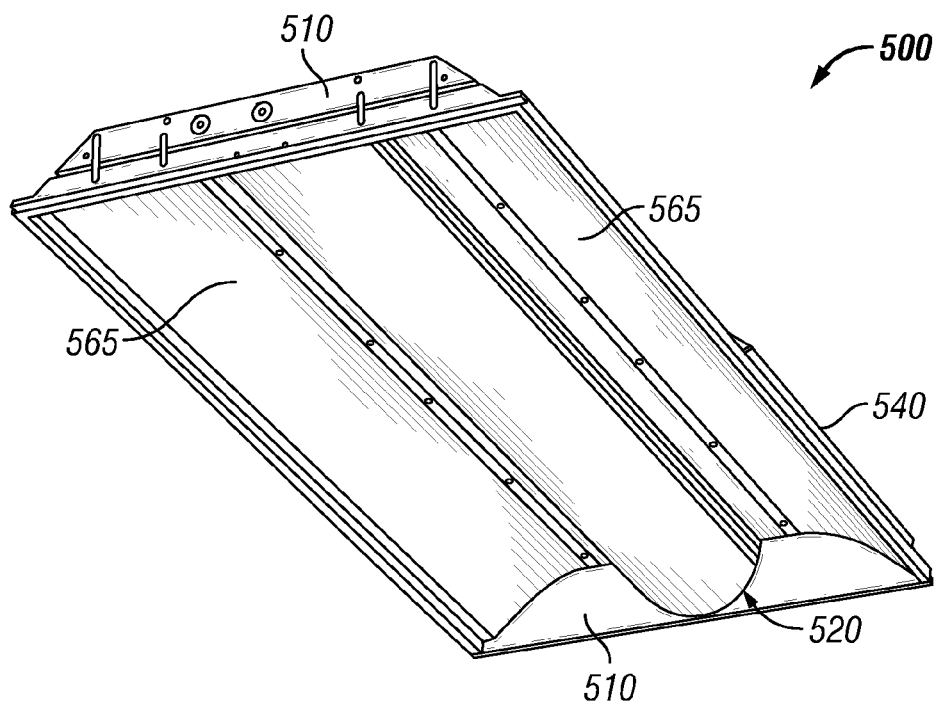
FIGS. 5A-5C show various views of yet another light fixture with a curved waveguide in accordance with certain example embodiments.
Figure 5B:
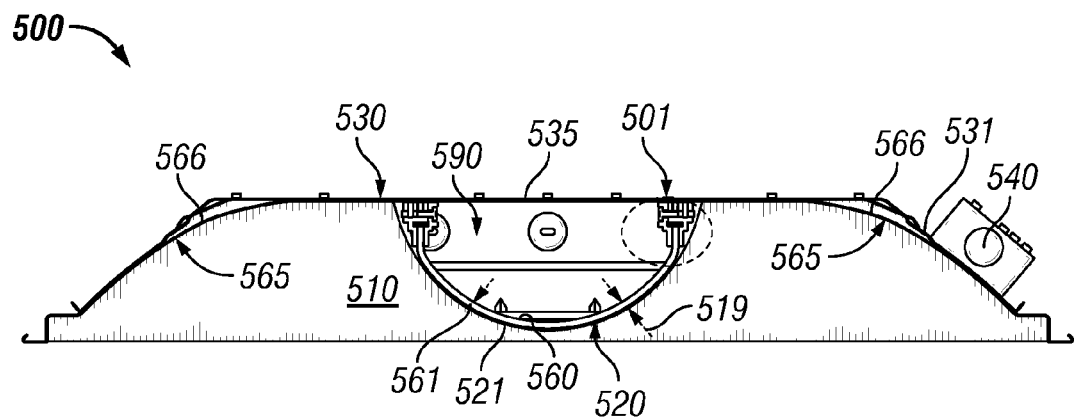
Figure 5C:
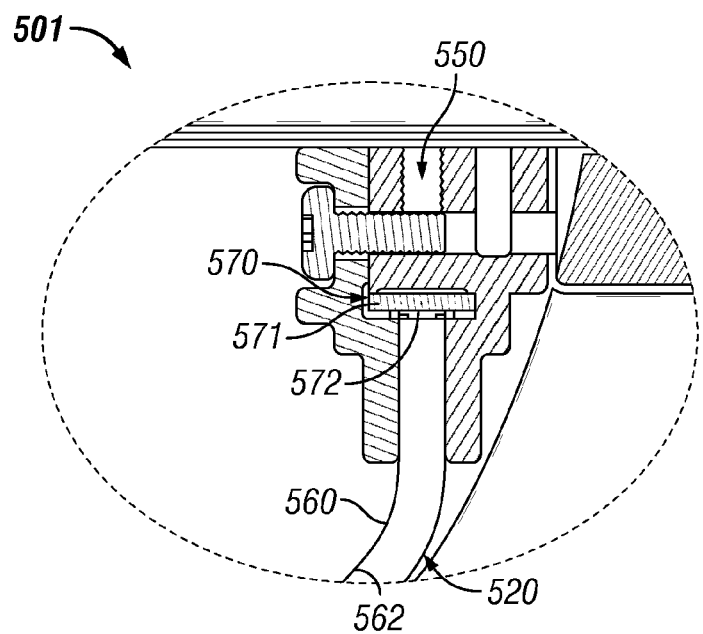

FIGS. 5A-5C show various views of yet another light fixture 500 with a curved waveguide 520 in accordance with certain example embodiments. Specifically, FIG. 5A shows a bottom-side perspective view of the light fixture 500. FIG. 5B shows a cross-sectional side view of the light fixture 500. FIG. 5C shows a detailed cross-sectional side view of a portion 501 of the light fixture 500. The light fixture 500 of FIGS. 5A-5C is substantially the same as the light fixture 400, except as described below. Specifically, referring to FIGS. 1A-5C, the power source 540 is disposed on the outer surface of the right-top side 531, outside the housing 530, instead of within the cavity 590. Also, the shape of the housing 530 differs, and so the curvature 566 of the reflectors 565 is slightly less concave.

Figure 6A:
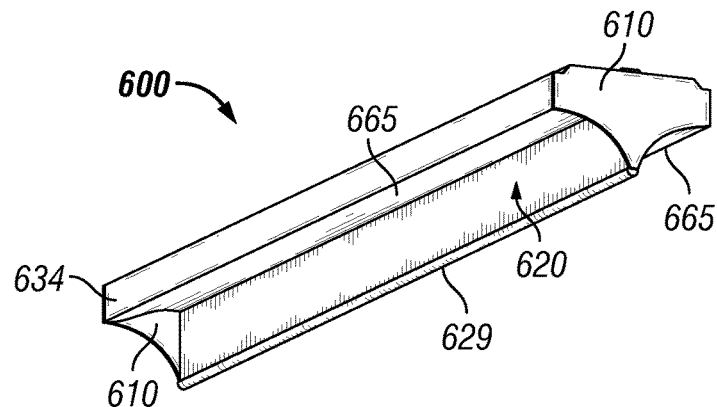
FIGS. 6A-6C show various views of still another light fixture with a curved waveguide in accordance with certain example embodiments.
Figure 6B:
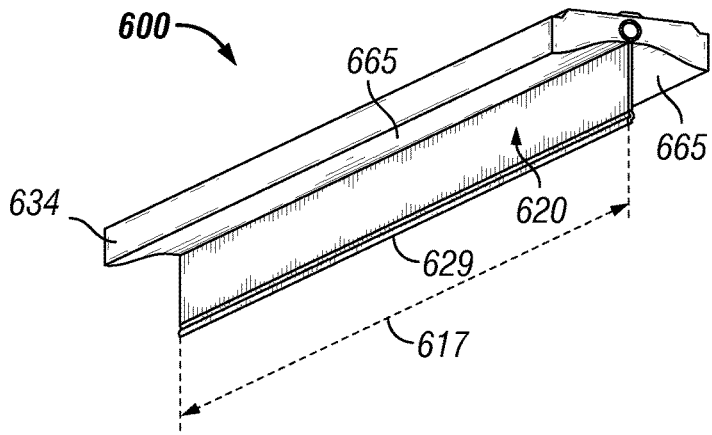
Figure 6C:
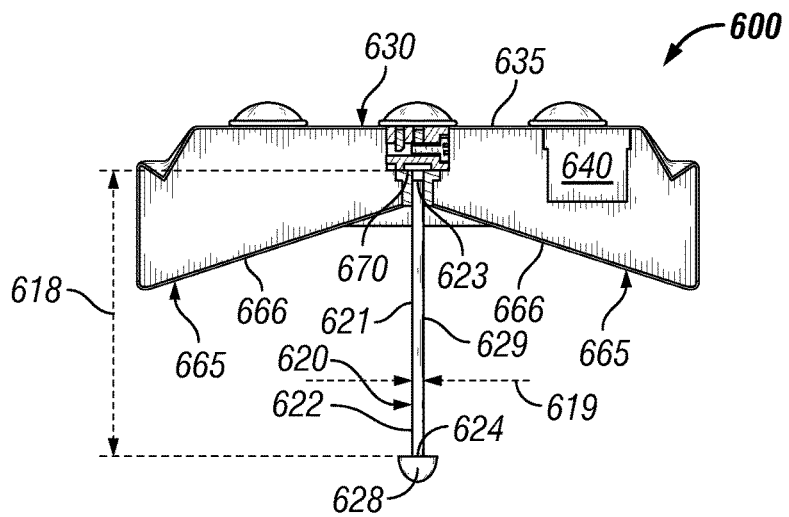

FIGS. 6A-6C show various views of still another light fixture 600 with a curved waveguide 620 in accordance with certain example embodiments. Specifically, FIG. 6A shows a bottom-side perspective view of the light fixture 600. FIG. 6B shows a bottom-side perspective view of the light fixture 600 without the end caps 610. FIG. 6C shows a cross-sectional side view of the light fixture 600. The light fixture 600 of FIGS. 6A-6C is substantially the same as the light fixtures described above, except as described below.

Referring to FIGS. 1A-6C, the light fixture 600 has a waveguide 620 that is substantially straight or planar (the curvature 621 is approximately zero), has a length 617 and a height 618, and hangs substantially vertically from the heat sink 650 mounted below the top side 635 of the housing 630. If the waveguide 620 is not straight (planar), then the curvature 621 is non-zero. Similarly, the light modules 670 are mounted within the heat sink 650 adjacent to the top side 623 of the waveguide 620. The light emitted by the light modules 670 is directed downward into the waveguide 620. In certain example embodiments, an optional diffuser 628 is disposed over the bottom side 624 of the waveguide 620, where the bottom side 624 is opposite the top side 623 and the light modules 670. As is the case with the light fixture 300 of FIGS. 3A-3C, there may be no reflector positioned adjacent to any surface (e.g., the left surface 622, the right surface 629) of the waveguide 620.

A reflector 665 can be positioned on each side of the light module 600. In this case, each reflector 665 is substantially straight (has a curvature 666 of approximately zero), and forms an acute angle with the waveguide 620. The angle formed between the waveguide 620 and each reflector can also be perpendicular or obtuse. In this case, while the curvature 666 of the reflectors 665 and the curvature 621 of the curved waveguide 620 are approximately zero, the angle between the reflectors 665 and the curved waveguide 620 can create some of the benefits (e.g., reduced or no glare) described herein.

Figure 7A:
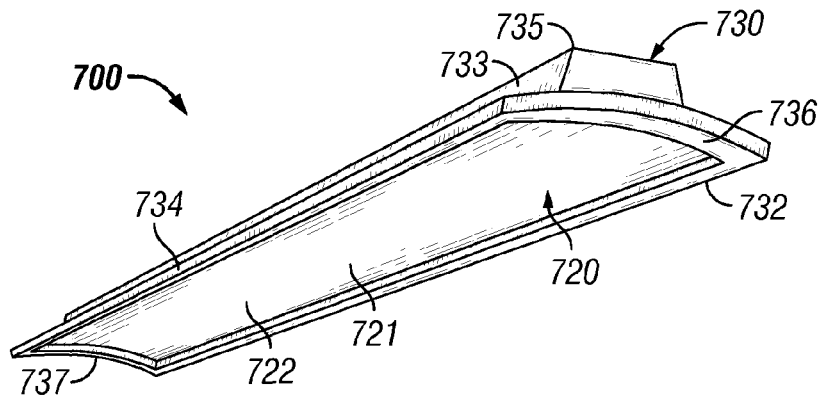
FIGS. 7A-7C show various views of yet another light fixture with a curved waveguide in accordance with certain example embodiments.
Figure 7B:
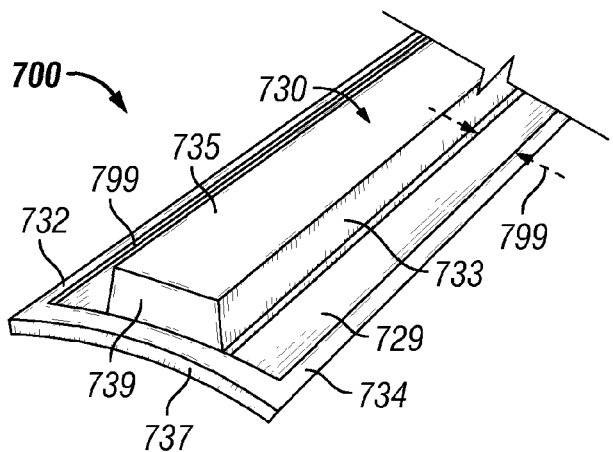
Figure 7C:
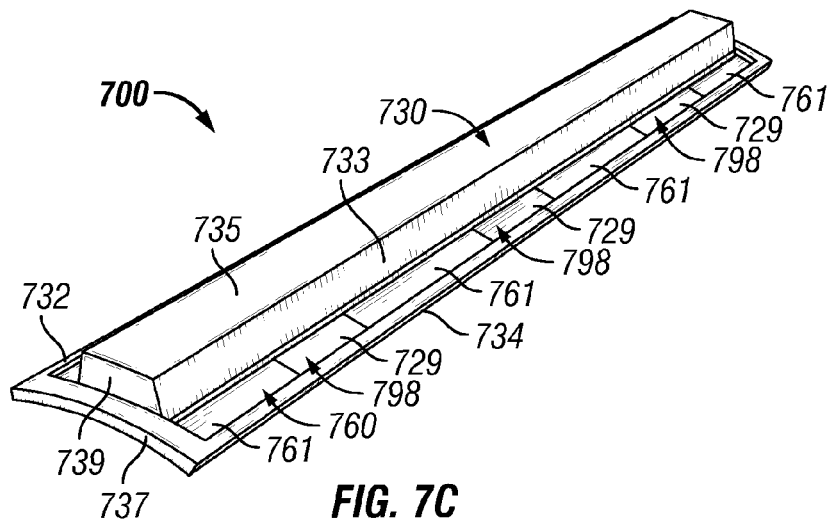

FIGS. 7A-7C show various views of yet another light fixture 700 with a curved waveguide 720 in accordance with certain example embodiments. Specifically, FIG. 7A shows a bottom-side perspective view of the light fixture 700. FIG. 7B shows a top-side perspective view of the light fixture 700. FIG. 7C shows a top-side perspective view of a portion of the light fixture 700. The light fixture 700 of FIGS. 7A-7C is substantially the same as the light fixture 100 of FIGS. 1A-1C, except as described below.

Specifically, referring to FIGS. 1A-7C, the housing 730 of the light fixture 700 of FIGS. 7A-7C allows for uplighting and/or direct access to the reflector 760. Uplighting is where light emitted through the curved waveguide 720 is directed upward (e.g., toward a ceiling), toward the housing 730. The light emitted by the curved waveguide 720 for uplighting is directed in the opposite direction from light emitted by the curved waveguide 720 for downlighting. Light emitted by the curved waveguide 720 for downlighting travels downward (e.g., toward a floor), away from the housing 730.

Uplighting is possible using the housing 730 of FIGS. 7A-7C because the housing 730 has one or more gaps 799. In this case, one gap 799 is disposed between the left side 734 and the left-top side 733 along the length of the housing

730. Another gap 799 is disposed between the right side 732 and the right-top side (hidden from view) along the length of the housing 730. In this case, the power source (hidden from view) and other such components of the light fixture 700 are disposed within a cavity formed by the front-top side 739, the left-top side 733, the right-top side, and the top side 735 of the housing 730. In addition, the light modules (hidden from view) and the sides of the curved waveguide 720 are disposed within a different cavity formed by the right side 732, the left side 734, the front side 737, and the rear side 736.

In certain example embodiments, the light fixture 700 has no reflector, and so any light emitted through the top surface 729 of the curved waveguide 720 that is disposed in the gaps 799 is used for uplighting, while the remainder of the light can be emitted through the bottom surface 722 of the curved waveguide 720 as downlighting. Alternatively, if the light fixture 700 has a reflector 760, as described with respect to the light fixture 100 in FIGS. 1A-1C, any light emitted through the top surface 729 of the curved waveguide 720 is reflected back through the top surface 729 and emitted through the bottom surface 722 of the curved waveguide 720 as downlighting.

In certain example embodiments, the reflector 760 includes one or more features 798 that reflect some light while allowing some light to pass therethrough. For example, as shown in FIG. 7C, a reflector 760 can have a number of apertures 798 that traverse through the wall of the reflector 760. In this way, portions of the top surface 729 of the curved waveguide 720 are accessible in the gaps 799, while the remainder of the gaps 799 are filled by the reflector 760. In this way, light emitted by the portions of the top surface 729 of the curved waveguide 720 that are positioned in the gaps 799 is used as uplighting, while light emitted by the portions of the top surface 729 of the curved waveguide 720 that are adjacent to the reflector 760 is reflected back through the top surface 729 into the curved waveguide 720 and directed out the bottom surface 722 as downlighting.

When the reflector 760 includes features 798 that reflect some light while allowing some light to pass therethrough, these features can be adjustable by a user. For example, if the features 798 are apertures, a user may be able to adjust the size of one or more apertures that are positioned in the gaps 799. Another example of a feature 798 can include a transparent, non-reflective material. In certain example embodiments, a reflector (such as any reflector described herein) can be disposed adjacent to the bottom surface 722 of the curved waveguide 720 to reduce or eliminate the amount of downlight while increasing the amount of uplight emitted by the light fixture 700.

Figure 8A:
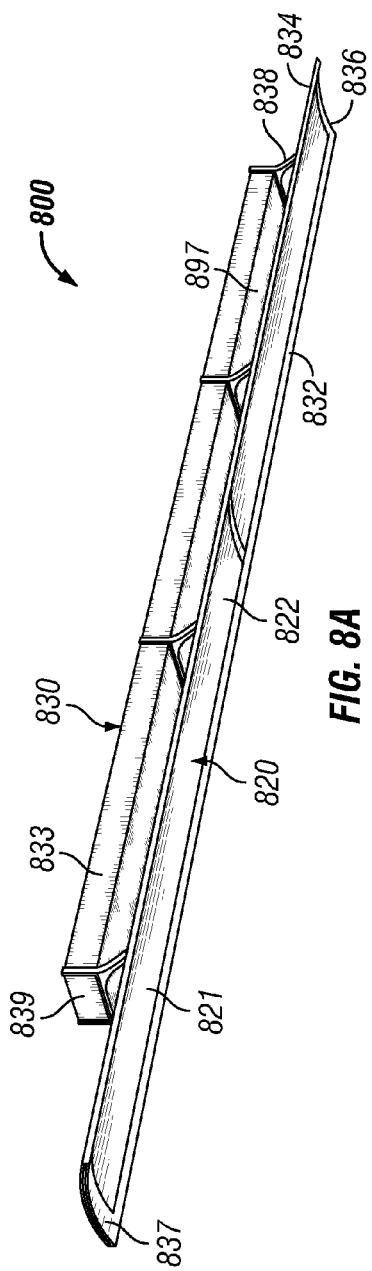
FIGS. 8A and 8B show various views of still another light fixture with a curved waveguide in accordance with certain example embodiments.
Figure 8B:
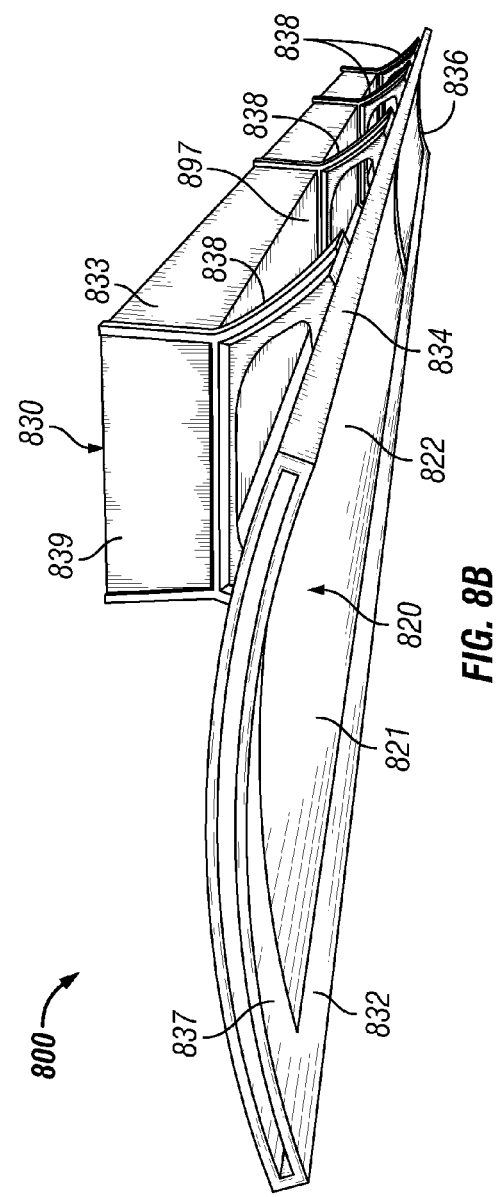

FIGS. 8A and 8B show various views of still another light fixture 800 with a curved waveguide 820 in accordance with certain example embodiments. Specifically, FIGS. 8A and 8B each shows a bottom-side perspective view of the light fixture 800. The light fixture 800 of FIGS. 8A and 8B is substantially the same as the light fixture 700 of FIGS. 7A-7C, except as described below.

Referring to FIGS. 1A-8B, the gaps (hidden from view) in the housing 830 occupy all (or substantially all) of the area defined by the right side 832, the left side 834, the front side 837, and the rear side 836 because the portion of the housing 830 that includes the left-top side 833, the front-top side 839, the right-top side (hidden from view), the rear-top side (hidden from view), the bottom-top side 897, and the top side 835 are physically elevated from the area defined by the right side 832, the left side 834, the front side 837, and the rear side 836.

One or more of a number of housing portion separators 838 of the housing 830 can be used to separate the part of the housing 830 formed by the left-top side 833, the front-top side 839, the right-top side (hidden from view), the rear-top side (hidden from view), the bottom-top side 897, and the top side 835 from the area defined by the right side 832, the left side 834, the front side 837, and the rear side 836. Examples of housing portion separators 838 can include, but are not limited to, standoffs (as shown in FIGS. 8A and 8B), chains, and brackets.

Since the gap in the housing 830 of FIGS. 8A and 8B spans substantially the entire area defined by the right side 832, the left side 834, the front side 837, and the rear side 836, the light fixture has greater potential for uplighting compared to the uplighting capability of the light fixture 700 of FIGS. 7A-7C. In certain example embodiments, portions of the housing 830 (e.g., bottom-top side 897) can be made of and/or coated with one or more materials (e.g., reflective material) to help direct or otherwise manipulate uplight emitted through the top surface of the curved waveguide 820. In addition, or in the alternative, one or more portions of the housing 830 defined by the left-top side 833, the front-top side 839, the right-top side (hidden from view), the rear-top side (hidden from view), the bottom-top side 897, and the top side 835 can have one or more features (e.g., contours, textures, curvatures) to help direct or otherwise manipulate uplight emitted through the top surface of the curved waveguide 820.

Example embodiments provide a number of benefits. Examples of such benefits include, but are not limited to, reduced glare, more consistent light output, and increased design flexibility for a light fixture. Example embodiments can also be used to generate uplight and/or downlight. In some cases, a user can control portions of one or more reflectors in example embodiments to control the amount of light (e.g., uplight, downlight) emitted by a light fixture.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture, comprising:
   a first heat sink;
   at least one first light module thermally coupled to the first heat sink;
   a waveguide comprising:
      a length;
      a width;
      a height; and
      a first side, wherein the at least one first light module is disposed adjacent to the first side and directs light into the waveguide; and
      a reflector disposed within a cavity proximate to the waveguide, wherein the reflector is separated from the waveguide to form a gap, wherein the reflector comprises at least one aperture that traverses therethrough, and wherein a portion of light emitted by the at least one first light module travels through the at least one aperture in the reflector.

2. The light fixture of claim 1, further comprising:
a second heat sink; and
at least one second light module thermally coupled to the second heat sink,
wherein the at least one second light module is disposed adjacent to a second side of the waveguide and directs light into the waveguide.

3. The light fixture of claim 1, wherein the waveguide has a first curvature along a first portion of the length of the waveguide, and wherein a section of the reflector that corresponds to the first portion of the waveguide comprises the first curvature.

4. The light fixture of claim 3, wherein the at least one aperture traverses a portion of the section of the reflector.

5. The light fixture of claim 1, wherein the waveguide has a first curvature along a first portion of the length of the waveguide, and wherein the first reflector comprises at least one first reflector portion having a second curvature.

6. The light fixture of claim 3, wherein the first curvature of the waveguide is disposed along the length of the waveguide.

7. The light fixture of claim 1, further comprising:
a housing comprising at least one wall that forms a cavity, wherein the first heat sink, the reflector, and the at least one first light module are disposed within the cavity.

8. The light fixture of claim 7, wherein the housing further comprises a first portion forming a first cavity and a second portion forming a second cavity, wherein a power source is disposed in the first cavity, and wherein the at least one first light module and at least a portion of the first heat sink are disposed in the second cavity.

9. The light fixture of claim 8, wherein the first portion of the housing has a first housing width, wherein the second portion of the housing has a second housing width, wherein the second housing width is greater than the first housing width.

10. The light fixture of claim 9, wherein the housing further comprises at least one standoff that separates the first portion of the housing from the second portion of the housing.

11. The light fixture of claim 1, wherein light generated by the at least one first light module is disbursed through a top and a bottom of the waveguide.

12. The light fixture of claim 10, wherein the first portion of the housing and the second portion of the housing are further separated from each other by an air gap.

13. A light fixture, comprising:
a heat sink comprising at least one coupling feature;
at least one first light module thermally coupled to the heat sink;
a waveguide comprising:
a waveguide length;
a waveguide width;
a waveguide height; and
a first side, wherein the at least one first light module is disposed adjacent to the first side and directs light into the waveguide;
a first housing comprising at least one first wall forming a first cavity having a first housing width and a first housing length, wherein a power source is disposed in the first cavity; and
a second housing comprising at least one second wall forming a second cavity having a second housing width and a second housing length, wherein the at least one first light module and at least a portion of the heat sink are disposed in the second cavity,
wherein the first housing width is less than the second housing width, and wherein the first housing length is less than the second housing length.

14. A light fixture, comprising:
a housing;
a heat sink disposed within the housing, wherein the heat sink comprises at least one coupling feature;
at least one light module thermally coupled to the heat sink;
a waveguide comprising:
a length;
a width;
a height; and
a first side, wherein the at least one light module is disposed adjacent to the first side and directs light into the waveguide; and
a first reflector disposed on the housing adjacent to a first surface of the waveguide, wherein the first surface of the waveguide is adjacent to the first side and is defined by the length and the width of the waveguide, wherein the first reflector, when viewed along the length of the waveguide, forms an acute angle with the waveguide at the first side of the waveguide,
wherein the waveguide extends away from the housing, and wherein the length and the width of the waveguide are disposed in a substantially vertical plane.

15. The light fixture of claim 14, wherein the first side of the waveguide is a top side of the waveguide, and wherein the at least one light module emits light downward into the waveguide.

16. The light fixture of claim 14, further comprising:
a second reflector disposed on the housing adjacent to a second surface of the waveguide, wherein the second surface is adjacent to the first side and is defined by the length and the width of the waveguide, wherein the second surface is opposite the first surface.

17. The light fixture of claim 16, wherein the second reflector, when viewed along the length of the waveguide, forms the acute angle with the waveguide at the first side of the waveguide.

18. The light fixture of claim 14, further comprising:
a diffuser disposed at a second side of the waveguide, wherein the second side is opposite the first side.

* * * * *